US006797789B2

(12) United States Patent
Davis et al.

(10) Patent No.: US 6,797,789 B2
(45) Date of Patent: Sep. 28, 2004

(54) PHENOLIC/POLYUREA COATING CO-POLYMER COMPOSITIONS AND PROCESS

(75) Inventors: Thomas E. Davis, Bay City, MI (US); Dudley J. Primeaux, II, Elgin, TX (US)

(73) Assignee: Visuron Technologies, Inc., Bay City, MI (US)

( * ) Notice: Subject to any disclaimer, the term of this patent is extended or adjusted under 35 U.S.C. 154(b) by 53 days.

(21) Appl. No.: 10/029,860

(22) Filed: Oct. 19, 2001

(65) Prior Publication Data

US 2003/0109644 A1 Jun. 12, 2003

(51) Int. Cl.$^7$ ............................................. C08G 18/10
(52) U.S. Cl. ..................... 525/458; 525/459; 525/504; 528/61; 428/423.1; 427/421; 427/426
(58) Field of Search ................................ 525/458, 459, 525/504; 528/61, 60; 428/423.1; 427/421, 426

(56) References Cited

U.S. PATENT DOCUMENTS

| | | | | |
|---|---|---|---|---|
| 4,036,906 A | * | 7/1977 | Finelli ........................... | 528/61 |
| 4,038,239 A | * | 7/1977 | Coyner et al. ................ | 524/872 |
| 4,806,615 A | * | 2/1989 | Rice et al. ..................... | 528/68 |
| 5,124,426 A | | 6/1992 | Primeaux, II et al. ......... | 528/60 |
| 5,162,388 A | | 11/1992 | Primeaux, II ................. | 521/159 |
| 5,171,818 A | | 12/1992 | Wilson ......................... | 528/59 |
| 5,266,671 A | | 11/1993 | Primeaux, II ................. | 528/68 |
| 5,480,955 A | | 1/1996 | Primeaux, II ................. | 528/60 |
| 5,504,181 A | | 4/1996 | Primeaux, II ................. | 528/60 |
| 5,574,123 A | * | 11/1996 | Bock et al. .................... | 528/45 |
| 6,013,755 A | | 1/2000 | Primeaux, II et al. ......... | 528/68 |
| 6,316,108 B1 | * | 11/2001 | Tabor et al. ................. | 428/423.1 |
| 6,569,953 B1 | * | 5/2003 | Dehm et al. .................. | 525/392 |

OTHER PUBLICATIONS

Oertel, Gunter, ed. "Polyurethane Handbook", $2^{nd}$ ed., Hanser Publishers, New York: 1994, pp. 105–106, 23–24, 571.*

D.J. Primeaux II and K.M. Hillman Polyurea Elastomer Technology: Bridging the Gap to Commercial Applications Polyurethanes Expo Sep. 17–20, 1998 pp. 543 to 550.

* cited by examiner

Primary Examiner—James J. Seidleck
Assistant Examiner—Melanie Bissett
(74) Attorney, Agent, or Firm—Dinnin & Dunn, P.C.

(57) ABSTRACT

This invention relates to the process of preparation and application of a plural component, fast cure phenolic/polyurea elastomer coating co-polymer system. The disclosed coating system is prepared from the reaction of an isocyanate component and an amine terminated resin blend component. Each of the two components may individually or both contain a phenolic resin based product as part of the active hydrogen donation for the reaction with the isocyanate. These phenolic/polyurea co-polymers are characterized as having significantly improved chemical resistance and lower moisture vapor transmission through the coating system over conventional polyurea elastomer coating systems, thus making the coatings suitable for highly corrosive environments.

51 Claims, No Drawings

PHENOLIC/POLYUREA COATING CO-POLYMER COMPOSITIONS AND PROCESS

BACKGROUND OF THE INVENTION

The present invention relates generally to the preparation and application of polyurea elastomeric coating/lining systems, and more particularly to a phenolic/polyurea co-polymer system for applications requiring extreme chemical resistance and performance.

Many different types of materials are used to build the engineering structures and vehicles found in our lives today. Most of these materials must be protected from environmental elements of one form or another. For instance, steel needs to be protected from moisture and oxygen to prevent corrosion. Likewise, wood needs to be protected from moisture to prevent rotting. Concrete should be protected from corrosion due to chlorides, other salts, and corrosive air. Further, moisture penetration can lead to spalling of concrete from freeze-thaw cycling.

During the last decade, environmental sensitivity has spawned the need for secondary containment around hazardous chemical storage tanks and processing equipment. Spray polyurea coating systems have become one of the major candidates for secondary containment use. They are used extensively to provide the monolithic impervious membrane to contain spilled and fugitive chemicals caused by leakage or accident.

In addition to the secondary containment of chemicals, surfaces, such as concrete floors, are frequently coated to control dust and dirt that are associated with the substrate when it is not coated. Further, it is often desirable to color code surfaces for pedestrian or worker safety. For instance, roadways have crosswalk striping, and safety railings are often orange or yellow. Identifying danger with a colored coating, and providing barriers to entry or exit are typical of this type of marking.

Many surfaces are coated simply for aesthetic purposes. Even if surfaces need not be protected from the elements, architectural designers commonly specify coatings or other decor to render the completed item artistically pleasing. The color combinations, patterns and decorations they specify are chosen with purpose and careful consideration to have the desired effect.

Paint and coating systems used for these purposes have proliferated over the decades, and polyurea spray elastomeric coating/lining technology has found a place in many of these application areas. Variations of the polyurea technology have allowed for UV color stability, abrasion resistance, easier processing conditions and improved substrate adhesion. U.S. Pat. No. 5,162,388 to Primeaux, II (1992) discloses Aliphatic Polyurea Elastomers comprising an (A) component and a (B) component. The (A) component includes an aliphatic isocyanate, while the (B) component includes an amine-terminated polyoxylalkylene polyol and certain specific cycloaliphatic diamine chain extenders. Primeaux, II (1992) represents one example of a polyurea elastomer system, and in particular, teaches a polyurea elastomer system with good flexibility and ultraviolet stability. U.S. Pat. No. 5,504,181 to Primeaux, II (1996) discloses Aliphatic Spray Polyurea Elastomers comprising an (A) component including an aliphatic isocyanate, and a (B) component including an amine-terminated polyoxyalkylene polyol, and an amine-terminated aliphatic chain extender. The elastomer of Primeaux, II (1996) must be prepared by impingement mixing the isocyanate preparation with the amine-terminated polyether. An additional example of a polyurea elastomer system is found in U.S. Pat. No. 5,480,955, also to Primeaux, II (1996), which teaches additional Aliphatic Spray Polyurea Elastomers. In that reference, the aliphatic spray polyurea elastomer disclosed comprises an (A) component which includes an aliphatic isocyanate, and a (B) component which includes (1) a primary amine-terminated polyoxyalkylene polyol with a molecular weight of at least about 2000, and (2) a specific primary amine-terminated chain extender. A Method of Preparing an Aliphatic Polyurea Spray Elastomer System is disclosed in another patent to Primeaux, II: U.S. Pat. No. 6,013,755. That reference teaches the preparation of a resin blend which is reacted with an isocyanate under conditions effective to form a polyurea elastomer.

The references disclosed herein teach effective methods and materials for coating and protecting a wide variety of substrates. Engineers, however, are always searching for improvements upon earlier inventions, as well as entirely new ones. Two primary deficiencies highly limit the use of polyurea systems in highly chemical/corrosive environments, and in immersion service. The main drawback to the polyurea technology in very corrosive applications is that the resistance to strong acid and base systems, as well as solvents, is very poor. Generally, resistance to crude or heavy fractions of petroleum is excellent, but the ability to withstand the presence of medium to light petroleum fractions is very poor. Solvent resistance also tends to be very selective and highly limited. While the current polyurea technology will withstand relatively low concentrations of acidic and basic solution, exposure to medium to high concentrations tends to result in extreme deterioration and failure in a very short time.

Additionally, the relatively higher moisture vapor permeation through the coating system allows for its delamination from certain substrates in immersion/lining applications. This problem is common in steel tank lining applications where you have a temperature gradient from inside the tank to the outside. In other words, the liquid inside the tank is heated and the ambient temperature outside the tank is relatively cooler. This results in a moisture drive through the coating/lining system and causes a phenomenon referred to as "Cold Wall Effect."

The present invention is directed to one or more of the problems or shortcomings associated with the prior art.

SUMMARY OF THE INVENTION

The present invention address one or more of the deficiencies noted above with respect to the current polyurea spray elastomer coating/lining technology. This invention will markedly improve the performance of the polyurea elastomer coating/lining technology with regard to both moisture vapor transmission and chemical resistance.

A primary aspect of the present invention is the reacting of phenolic resins, blended into the resin blend component, with polyisocyanates in the polyurea formulation. The incorporation of the phenolic resins into the polyurea backbone will increase cross-link density of the cured polymer, resulting in a reduction of the moisture vapor transmission compared to non-phenolic containing polyurea system.

Phenolics are also known for their chemical resistance, and it is therefore expected that the inclusion of phenolic resins will enhance the chemical resistance of cured systems. Phenolics are also known for high temperature resistance, making another benefit of phenolic inclusion an increased elevated temperature resistance over non-phenolic systems.

Phenolics are also known for their superior adhesion characteristics compared to other materials. The use of phenolic resins in the polyurea technology will tend to improve adhesion to the various substrates that are coated/lined, and give significant performance advantages over the current polyurea elastomer coating/lining technology.

To complement the above, specialized epoxy resins may be incorporated to form an Interpenetrating Polymer Network, further enhancing the target properties of the present invention.

DETAILED DESCRIPTION OF THE PREFERRED EMBODIMENT

The present invention relates to the preparation and application of plural component, phenolic/polyurea co-polymer coating systems that exhibit significantly improved chemical resistance as compared to conventional polyurea elastomer coating systems. The present systems include the reaction product of two components to produce a phenolic/polyurea co-polymer elastomeric coating system. In the preferred embodiment, the first, (a), component comprises an isocyanate, and preferably includes an isocyanate quasi-prepolymer of an isocyanate and an active hydrogen containing material. The second, (b), component comprises a resin blend of an active amine hydrogen containing material, which is preferably an amine-terminated polyether, and a phenolic resin. In the preferred embodiment, component (b) also includes a chain extender, although it should be appreciated that an elastomer could be developed that did not incorporate a chain extender without departing from the spirit and scope of the present invention. Because the phenolic-based resins are also an active hydrogen containing material, they may also be utilized in preparation of the isocyanate quasi-prepolymer. The phenolic resin is preferably introduced during the preparation/blending of the co-polymer system components.

Examples of amine terminated polyethers, isocyanates, and chain extenders that can be used in accordance with the present invention are those well known in the polyurea art as described in U.S. Pat. Nos. 4,891,086; 5,013,813; 5,082,917; 5,153,232; 5,162,388; 5,171,819; 5,189,075; 5,218,005; 5,266,671; 5,317,076; 5,442,034; 5,480,955; 5,504,181; 5,616,677; and 6,013,755, all incorporated herein by reference. It should be understood that other materials, in addition to those listed in the aforementioned patents, might be used without departing from the scope of the present invention.

The active amine hydrogen containing materials employed in the present invention are preferably amine-terminated polyethers. However, the use of high molecular weight amine-terminated alkylenes, simple alkyl amines, and other suitable amine-terminated materials with varying molecular weights and chemical compositions are contemplated by the present invention, and could be used alone or in combination with other suitable materials without departing from its intended scope. The term "high molecular weight," is intended to include polyether amines having a molecular weight of at least about 1,500. The preferred amine-terminated polyethers should be selected from aminated diols or triols, and a blend of aminated diols and/or triols is most desirable. The amine-terminated polyethers are preferably selected from mixtures of high molecular weight polyols, such as mixtures of di- and trifunctional materials. In particular, primary and secondary amine-terminated polyethers with a molecular weight greater than 1500, even more desirably greater than 2000, a functionality from about 2 to about 6, and an amine equivalent weight of from about 750 to about 4000 are preferred. In the preferred embodiment, such amine-terminated polyethers having a functionality of from about 2 to about 3 are used. These materials may be made by various methods known in the art. It is not necessary that a blend of polyethers be used, and it should be appreciated that a single high molecular weight aminated polyol might be used without departing from the scope of the present invention.

The amine-terminated polyethers preferred in the instant invention may be, for example, polyether resins made from an appropriate initiator to which lower alkylene oxides, such as ethylene oxide, propylene oxide, butylene oxide, or mixtures thereof, are added with the resulting hydroxyl-terminated polyol then being aminated. When two or more oxides are used, they may be present as random mixtures or as blocks of one or the other polyether. In the amination step, it is highly desirable that the terminal hydroxyl groups in the polyol be essentially all secondary hydroxyl groups for ease of amination. The polyols so prepared are then reductively aminated by known techniques, such as described in U.S. Pat. No. 3,654,370, for example, the contents of which are incorporated herein by reference. Normally, the amination step does not completely replace all of the hydroxyl groups. However, the greatest majority of hydroxyl groups are replaced by amine groups. Therefore, in a preferred embodiment, the amine-terminated polyether resins useful in this invention have greater than about 90 percent of their active hydrogens in the form of amine hydrogens.

Particularly noted are the JEFFAMINE® brand series of polyether amines available from Huntsman Corporation. They include JEFFAMINE® D-2000, JEFFAMINE® D-4000, JEFFAMINE® T-3000 and JEFFAMINE® T-5000. These polyetheramines are described with particularity in Huntsman Corporation's product brochure entitled "The JEFFAMINE® Polyoxyalkyleneamines". Other similar polyether amines are commercially available from BASF and Arch Chemicals.

Both aromatic and aliphatic isocyanates can be used in the present invention, and the preferred aliphatic isocyanates include those known to one skilled in the polyurea elastomer art. Thus, for instance, the aliphatic isocyanates are of the type described in U.S. Pat. No. 5,162,388, the contents of which are incorporated herein by reference. They are typically aliphatic diisocyanates and are preferably the bifunctional monomer of the tetraalkyl xylene diisocyanate, such as the tetramethyl xylene diisocyanate, or the trimerized or the biuret form of an aliphatic diisocyanate, such as hexamethylene diisocyanate. In addition, cylcohexane diisocyanate and isophorone diisocyanate are considered preferred aliphatic isocyanates. Other useful aliphatic polyisocyanates are described in U.S. Pat. No. 4,705,814, which is incorporated herein by reference. The aforementioned isocyanates can be used alone or in combination.

A wide variety of aromatic isocyanates, preferably polyisocyanates, can also be utilized to produce the polyurea elastomer that is the object of the present invention. Typical aromatic polyisocyanates include p-phenylene diisocyanate, polymethylene polyphenyl-isocyanate, 2,6-toluene diisocyanate, 2,4-toluene diisocyanate, naphthalene-1,4-diisocyanate, bis-(4-isocyanatophenyl)methane, and bis-(3-methyl-4-isocyanatophenyl)methane. Other aromatic isocyanates used in the practice of this invention are methylene-bridged polyphenyl polyisocyanate mixtures which have functionalities of from about 2 to about 4. These aromatic isocyanates are well described in the literature and in many patents, for example, U.S. Pat. Nos. 2,683,730; 2,950,263; 3,012,008; 3,344,162; and 3,362,979, all incorporated herein by reference.

Usually methylene-bridged polyphenyl polyisocyanate mixtures contain from about 20 to about 100 wt % methylene diphenyl diisocyanate isomers, with the remainder being polymethylene polyphenyl diisocyanate having higher functionalities and higher molecular weights. Typical of these are polyphenyl polyisocyanate mixtures containing from about 20 to about 100 wt % diphenyldiisocyanate isomers, of which from about 20 to about 95 wt % thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and may be prepared by the process described in U.S. Pat. No. 3,362,979.

By far the most preferred aromatic polyisocyanate is methylene bis(4-phenylisocyanate) or "MDI". Pure MDI, quasi-prepolymers of MDI, and modified pure MDI, etc., are useful. Materials of this type may be used to prepare suitable elastomers. Since pure MDI is a solid and, thus, inconvenient to use, liquid products based on MDI are also disclosed herein. For example, U.S. Pat. No. 3,394,164, which is incorporated herein as reference, describes a liquid MDI product. More generally, uretonimine modified pure MDI is also included. This product is made by heating pure distilled MDI in the presence of a catalyst. Examples of commercial materials of this type are ISONATE® 125M (pure MDI) and ISONATE® 2143L, RUBINATE® 1680, RUBINATE® 1209 and MONDUR® ML ("liquid" MDIs). The ISONATE® products are available from Dow Chemical, the RUBINATE® products are available from Huntsman Polyurethanes and the MONDUR products available from Bayer Corporation.

Preferably, the amount of isocyanate used to produce the present polyurea elastomers is equal to or greater than the stoichiometric amount based on the active hydrogen ingredients in the formulation. The ratio of equivalents of isocyanate groups in the polyisocyanate to the active hydrogens, preferably amine hydrogens, is in the range of 0.95:1 to about 2.00:1, with about 1.00:1 to about 1.50:1 being preferred and about 1.05:1 to about 1.30:1 being most preferred. This ratio is sometimes referred to as the isocyanate INDEX and is expressed as a percentage of excess isocyanate. The isocyanate INDEX compares the total isocyanate with the total active hydrogen in the reactant compounds.

It should be understood that the term "isocyanate" also includes quasi-prepolymers of isocyanates with active hydrogen-containing materials. The active hydrogen-containing materials used to prepare a prepolymer can include a polyol or a high molecular weight amine-terminated polyether, also described herein as amine terminated alkylenes, or a combination of these materials. The amine-terminated polyethers useful in preparing quasi-prepolymers of isocyanate include the same amine-terminated polyethers described herein as amine-terminated materials for producing polyureas.

The isocyanate quasi-prepolymer of component (a) is preferably prepared from an active hydrogen containing material selected from the group consisting of polyols, amine-terminated alkylenes, and blends thereof. The polyols used in preparing a quasi-prepolymer preferably include polyether polyols, polyester diols, triols, etc., should have an equivalent weight of at least 500, and more preferably at least about 1,000 to about 5,000. In particular, those polyether polyols based on trihydric initiators of about 4,000 molecular weight and above are especially preferred. The polyethers may be prepared from ethylene oxide, propylene oxide, butylene oxide or mixture of propylene oxide, butylene oxide and/or ethylene oxide. Other high molecular weight polyols that may be useful in this invention are polyesters of hydroxyl-terminated rubbers, e.g., hydroxyl terminated polybutadiene. Quasi-prepolymers prepared from hydroxyl-terminated polyols and isocyanates are generally reserved for use with aromatic polyurea spray systems.

Isocyanate quasi-prepolymers are also available commercially prepared. These are based on different types of MDI monomers and a variety of polyether and polyester polyols. These products are sold under the various trade names of: RUBINATE 9009, RUBINATE 9495, RUBINATE 9484, RUBINATE 9480, and RUBINATE 9272, all from Huntsman Polyurethanes; MONDUR 1453 and MONDUR 1437 form Bayer Corporation.

U.S. Pat. No. 5,442,034, incorporated herein by reference, teaches one that alkylene carbonates may be incorporated in the isocyanate quasi-prepolymer for improved mixing characteristics of the polyurea elastomer system. The preferred alkylene carbonates used in the present invention include ethylene carbonate, propylene carbonate, butylene carbonate and dimethyl carbonate, or mixtures thereof.

The present polyurea elastomer systems may also comprise an amine-terminated chain extender. The aromatic chain extenders preferably used in the present invention include many amine-terminated aromatic chain extenders that are well known to the polyurea art. Typical aromatic chain extenders include, for example, 1-methyl-3,5-diethyl-2,4-diaminobenzene, 1-methyl-3,5-diethyl-2,6-diaminobenzene (both referred to as diethyltoluene diamine or DETDA and are commercially available form Albemarle), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. Other useful aromatic chain extenders include, but are not limited to, di(methylthio)toluene diamine or N,N'-bis(sec-butyl)methylenedianiline, each of which can be used alone or, preferably, in combination with 1-methyl-3,5-diethyl-2,4-diaminobenzene or 1-methyl-3,5-diethyl-2,6-diaminobenzene. This combination includes from about 20 to about 99 parts of di(methylthio)toluene diamine of N,N'-bis(sec-butyl)methylenedianiline to about 80 to about 1 parts DETDA.

Other examples of useful chain extenders include low molecular weight amine-terminated polyethers, including primary and secondary amine-terminated polyethers of less than 400 molecular weight, having a functionality of from about 2 to about 6, preferably from about 2 to about 4. In addition, low molecular weight amine-terminated alkylenes and simple alkyl amines are included within the scope of this invention, and may be used alone or in combination with the aforementioned amine-terminated polyols. In addition, other amine-terminated materials having different molecular weight or different chemical compositions may be used. The term "low molecular weight" is intended to include polyether amines having a molecular weight of less than 400. Although the chain extenders used in the present invention are preferably amine-terminated chain extenders, they need not be amine-terminated materials at all. Alternatives include low molecular weight hydroxyl-terminated polyethers, having a functionality of from about 2 to about 6, preferably from about 2 to about 4. These include, but are not limited to, ethylene glycol, propylene glycol, glycerin and 1,4-butanediol.

The preferred phenolic resins used in the instant invention are those that have an active hydrogen content of equal to or greater than 2. In other words, a hydroxyl functionality of greater than or equal to 2. Mono-functional phenolic resins are not preferred, because they are likely to lead to polymer chain termination, potentially severely affecting elastomer physical properties and performance. Examples of useful phenolic resins are ARYLFLEX® DS, a di-functional resin, and ARYLFLEX M4P, a tetra-functional resin. Both products are available from Lyondell Chemical. The use of such phenolic resins in a single component, moisture-cure polyurethane application is taught in U.S. Pat. No. 6,245,877.

The polyurea elastomers of the present invention are characterized by urea linkages formed by the reaction of active amine hydrogen groups with isocyanates. However, some of the active hydrogen groups in the reaction mixture are in the form of hydroxyl groups in the phenolic resins. Thus, the polyurea elastomers referred to herein are those formed from reaction mixtures having at least about 70 percent of the active hydrogen groups in the form of amine groups. Preferably, the reaction mixtures have at least about 80 percent of the active hydrogen groups in the form of amine groups, and even more preferably, the reaction mixtures have at least 85 percent of the active hydrogen groups in the form of amine groups.

Another component that may be included as part of the present elastomer system is an epoxy resin. Epoxy resins tend to react with active hydrogens on amine functional materials, forming the basis of the epoxy reaction/curing mechanism. For this reason, the epoxy resin is preferably not incorporated into the active amine hydrogen resin blend component (b). Many epoxy resins also tend to react with isocyanate components making incorporation into the isocyanate side of the disclosed coating system also difficult. By using specially modified epoxy resins, they may be included in the isocyanate side of the coating system without any problem. Once this component is mixed with the resin blend component of the disclosed system, the epoxy resins can react with the active amine hydrogens to form an Interpenetrating Polymer Network. This tends to further improve chemical resistance, lower moisture vapor transmission and possibly improves substrate adhesion. These epoxy resins are preferably based on cyclohexanedimethanol diglycidyl ethers and supplied as ERISYS GE-22 and ERISYS GE-22S from CVC Specialty Chemicals.

Pigments, for example, titanium dioxide and/or carbon black, may also be incorporated in the elastomer system to impart color properties. Pigments may be in the form of solids or the solids may be pre-dispersed in a resin carrier. Reinforcements, for example, flake or milled glass, and fumed silica, may also be incorporated in the elastomer system to impart certain properties. Other additives such as UV stabilizers, antioxidants, air release agents, adhesion promoters, or structural reinforcing agents may be added to the mixture depending on the desired characteristics of the end product. These are generally known to those skilled in the art.

Preferably, the phenolic/polyurea co-polymer coating/lining systems of the present invention are prepared using plural component, high pressure, high temperature spray equipment. As known in the art, plural component equipment combines two components, an (a) component and a (b) component. The (a) component generally includes an isocyanate material, while the (b) component generally includes the amine terminated polyethers and phenolic resins. Other additives may also be included in the resin blend component as noted previously. The (a) component and the (b) component of the phenolic/polyurea co-polymer system are preferably combined or mixed under high pressure. In a preferred embodiment, they are impingement mixed directly in the high-pressure spray equipment. This equipment for example includes: GUSMER H-2000, GUSMER H-3500, GUSMER H-20/35 and Glas-Craft MH type proportioning units fitted with either a GUSMER GX-7, GUSMER GX-7 400 series or GUSMER GX-8 impingement mix spray gun. The two components are mixed under high pressure inside the spray gun thus forming the coating/lining system, which is then applied to the desired substrate via the spray gun. The use of plural component spray equipment, however, is not critical to the present invention and is included only as one example of a suitable method for mixing the phenolic/polyurea co-polymer systems of the present invention.

A further advantage of the present invention is that the phenolic/polyurea co-polymer reactants discussed herein can react to form the present phenolic/polyurea co-polymer elastomer system without the aid of a catalyst. Catalysts may be used in the normal preparation of the isocyanate quasi-prepolymer. Therefore, the catalyst may be excluded during the practice of this invention in the preparation of the plural component, phenolic/polyurea co-polymer elastomer system.

Post curing of the phenolic/polyurea co-polymer elastomeric system is optional. Post curing will improve certain elastomeric properties, and use depends on the desired properties of the end product. Post curing may be used as a tool to speed up the final cure of the phenolic/polyurea co-polymer to allow for rapid elastomer properties evaluation.

As a result of the improved chemical resistance, lower moisture vapor transmission and substrate adhesion of the phenolic/polyurea co-polymer systems, the present invention produces excellent candidate materials for coating/lining applications of substrates such as concrete, steel, aluminum, glass, fiberglass, pressed wood oriented strand board, asphalt, thermoplastic polymers of polyethylene and polypropylene, expanded polystyrene, polyurethane foam, sealants and goetextile fabrics. The fast cure time of the systems of the present invention will allow for rapid turn around time for the coating/application work. This could include steel tank lining, concrete tank linings, sewage and waste-water lift stations, pipe linings, secondary containment, roof coating, bedliners, road marking coatings, traffic deck coatings and off-shore corrosion protection in the refining and maritime industry.

It should be understood that the present description is for illustrative purposes only and should not be construed to limit the scope of the present invention in any way. Thus, those skilled in art will appreciate that various modifications and alterations to the presently disclosed embodiments might be made without departing from the intended spirit and scope of the present invention. Additional advantages and details of the present invention are evident upon an examination of the following examples and appended claims.

EXAMPLES ILLUSTRATING THE USEFULNESS OF THE INVENTION

The following examples illustrate the usefulness of this application:

Example I

A phenolic/polyurea co-polymer elastomer systems was prepared by first preparing the isocyanate quasi-prepolymer (A-Component). This isocyanate quasi-prepolymer was prepared by the addition of 45 pbw JEFFAMINE D-2000 under agitation to 45 pbw of VESTANAT IPDI (Isophorone diisocyanate). This was allowed to react, and upon cooling, 10 pbw of propylene carbonate was added.

Prior to preparation of the complete resin blend (B-Component), an IPD/DEM Adduct useful in the Example I was prepared. The IPD/DEM Adduct was prepared by slow addition of STAYFLEX DEM, 49.1 pbw to VESTAMINE IPD, 50.9 pbw. This adduct was then used in the following preparation.

The resin blend (B-Component) was prepared by mixing JEFFAMINE D-2000, 14.4 pbw; JEFFAMINE T-5000, 15.4 pbw; ARYLFLEX DS, 15.0 pbw; IPD/DEM Adduct, 22.0 pbw; VESTAMINE IPD, 7.0 pbw; JEFFAMINE D-230, 7.0 pbw; SILQUEST A-187, 0.2 pbw; water, 0.1 pbw; and pigment dispersion, 19.0 pbw.

The Isocyanate quasi-prepolymer and the resin blend component were then mixed using high pressure, high temperature impingement mix spray equipment to for the phenolic/polyurea co-polymer. This system had an effective gel time of 13 seconds. Formulation information is summarized, as well as elastomer physical property information in Table 1.

Example II

A phenolic/polyurea co-polymer elastomer systems was prepared by first preparing the isocyanate quasi-prepolymer (A-Component). This isocyanate quasi-prepolymer was prepared by the addition of 24.3 pbw TERATHANE 650 to 70.6 pbw ISONATE 143L. 0.1 pbw T-12 catalyst was added to complete the reaction of the quasi-prepolymer. After reaction to form the quasi-prepolymer, 5.0 pbw propylene carbonate was added.

The resin blend (B-Component) was prepared by mixing JEFFAMINE D-2000, 14.08 pbw; JEFFAMINE T-5000, 28.35 pbw; ETHACURE 100, 17.04 pbw; UNILINK 4200, 8.66 pbw; ARYLFLEX DS, 23.7 pbw; 1,4-butanediol, 3.17 pbw; SILQUEST A-187, 0.37 pbw; BYK-A 501, 0.37 pbw; BYK-320, 0.56 pbw; and pigment dispersion, 3.7 pbw.

The Isocyanate quasi-prepolymer and the resin blend component were then mixed using high pressure, high temperature impingement mix spray equipment to form the phenolic/polyurea co-polymer. The system was applied to a flat substrate with a release agent applied such that a film of the phenolic/polyurea co-polymer could be removed for testing. This system had an effective gel time of 6 seconds. Formulation information is summarized, as well as elastomer physical property information in Table 1.

Example III

A phenolic/polyurea co-polymer elastomer systems was prepared by first preparing the isocyanate quasi-prepolymer (A-Component). This isocyanate quasi-prepolymer was prepared by the addition of 26.5 pbw ARYLFLEX DS to 68.3 pbw ISONATE 143L. 0.2 pbw COSCAT 16 catalyst was added to complete the reaction of the quasi-prepolymer. After reaction to form the quasi-prepolymer, 5.0 pbw propylene carbonate was added.

The resin blend (B-Component) was prepared by mixing JEFFAMINE D-2000, 14.08 pbw; JEFFAMINE T-5000, 28.35 pbw; ETHACURE 100, 17.04 pbw; UNILINK 4200, 8.66 pbw; ARYLFLEX DS, 23.7 pbw; 1,4-butanediol, 3.17 pbw; SILQUEST A-187, 0.37 pbw; BYK-A 501, 0.37 pbw; BYK-320, 0.56 pbw; and pigment dispersion, 3.7 pbw.

The Isocyanate quasi-prepolymer and the resin blend component were then mixed using high pressure, high temperature impingement mix spray equipment to form the phenolic/polyurea co-polymer. The system was applied to a flat substrate with a release agent applied such that a film of the phenolic/polyurea co-polymer could be removed for testing. This system had an effective gel time of 6 seconds. Formulation information is summarized, as well as elastomer physical property information in Table 1.

Example IV

A phenolic/polyurea co-polymer elastomer systems was prepared by first preparing the isocyanate quasi-prepolymer (A-Component). This isocyanate quasi-prepolymer was prepared by the addition of 13.3 pbw ARYLFLEX DS and 13.2 pbw TERATHANE 650 to 68.3 pbw ISONATE 143L. 0.2 pbw COSCAT 16 catalyst was added to complete the reaction of the quasi-prepolymer. After reaction to form the quasi-prepolymer, 5.0 pbw propylene carbonate was added.

The resin blend (B-Component) was prepared by mixing JEFFAMINE D-2000, 14.08 pbw; JEFFAMINE T-5000, 28.35 pbw; ETHACURE 100, 17.04 pbw; UNILINK 4200, 8.66 pbw; ARYLFLEX DS, 23.7 pbw; 1,4-butanediol, 3.17 pbw; SILQUEST A-187, 0.37 pbw; BYK-A 501, 0.37 pbw; BYK-320, 0.56 pbw; and pigment dispersion, 3.7 pbw.

The Isocyanate quasi-prepolymer and the resin blend component were then mixed using high pressure, high temperature impingement mix spray equipment to form the phenolic/polyurea co-polymer. The system was applied to a flat substrate with a release agent applied such that a film of the phenolic/polyurea co-polymer could be removed for testing. This system had an effective gel time of 6 seconds. Formulation information is summarized, as well as elastomer physical property information in Table 1.

Example V

Comparative Example V is a standard, aromatic polyurea spray elastomer system prepared by using an RUBINATE 9484, 100 pbw as the isocyanate quasi-prepolymer (A-Component).

The resin blend (B-Component) was prepared by mixing JEFFAMINE D-2000, 51.0 pbw; JEFFAMINE T-5000,, 15.0 pbw; ETHACURE 100, 25.2 pbw; UNILINK 4200, 3.2 pbw; SILQUEST A-187, 0.5 pbw; and pigment dispersion, 3.7 pbw.

The Isocyanate quasi-prepolymer and the resin blend component were then mixed using high pressure, high temperature impingement mix spray equipment to form the polyurea elastomer. The system was applied to a flat substrate with a release agent applied such that a film of the polyurea elastomer could be removed for testing. This system had an effective gel time of 12 seconds. Formulation information is summarized, as well as elastomer physical property information in Table 1.

TABLE 1

| Example | I | II | III | IV | V |
|---|---|---|---|---|---|
| Isocyanate (A), pbw: | | | | | |
| VESTANAT IPDI | 45.0 | — | — | — | — |
| ISONATE 143L | — | 70.6 | 68.3 | 68.3 | — |
| RUBINATE 9484 | — | — | — | — | 100 |
| JEFFAMINE D-2000 | 45.0 | — | — | — | — |
| ARYLFLEX DS | — | — | 26.5 | 13.1 | — |

TABLE 1-continued

| Example | I | II | III | IV | V |
|---|---|---|---|---|---|
| TERATHANE 650 | — | 24.3 | — | 13.2 | — |
| Propylene Carbonate | 10.0 | 5.0 | 5.0 | 5.0 | — |
| T-12 | — | 0.1 | — | — | — |
| COSCAT 16 | — | — | 0.2 | 0.2 | — |
| Resin Blend (B), pbw: | | | | | |
| JEFFAMINE D-2000 | 14.4 | 14.08 | 14.08 | 14.08 | 51.0 |
| JEFFAMINE T-5000 | 15.4 | 28.35 | 28.35 | 28.35 | 15.0 |
| ARYLFLEX DS | 15.0 | 23.7 | 23.7 | 23.7 | — |
| ETHACURE 100 | — | 17.04 | 17.04 | 17.04 | 25.2 |
| UNILINK 4200 | — | 8.66 | 8.66 | 8.66 | 3.2 |
| VESTAMINE IPD | 7.0 | — | — | — | — |
| IPD/DEM Adduct | 22.0 | — | — | — | — |
| JEFFAMINE D-230 | 7.0 | — | — | — | — |
| 1,4 Butanediol | — | 3.17 | 3.17 | 3.17 | — |
| Pigment Dispersion | 19.0 | 3.7 | 3.7 | 3.7 | 5.0 |
| SILQUEST A-187 | 0.2 | 0.37 | 0.37 | 0.37 | 0.5 |
| Water | 0.1 | — | — | — | — |
| BYK-A 501 | — | 0.37 | 0.37 | 0.37 | — |
| BYK-320 | — | 0.56 | 0.56 | 0.56 | — |
| Processing: | | | | | |
| A:B volume ratio | 1.00 | 1.00 | 1.00 | 1.00 | 1.00 |
| INDEX | 1.11 | 1.15 | 1.15 | 1.15 | 1.05 |
| Gel time, sec | 13 | 6 | 6 | 6 | 12 |
| Physical properties: | | | | | |
| Tensile strength, psi | NT | 5744 | 5137 | 4720 | 2750 |
| Elongation, % | NT | 55 | 239 | 260 | 425 |
| Tear strength, pli | NT | 1617 | 1395 | 1031 | 430 |
| Shore D Hardness | NT | 55 | 62 | 57 | 46 |

Chemical Resistance Testing

To illustrate the advantage of the phenolic/polyurea co-polymer elastomer over conventional polyurea elastomer systems, aggressive chemical exposure testing was used, according to ASTM D 1308, method 3 (7 day immersion at 25° C.), "Test Method for Effect of Household Chemicals on Clear and Pigmented Organic Finishes". The results of the testing are shown in Table 2.

TABLE 2

| Example | II | III | IV | V |
|---|---|---|---|---|
| Sulfuric Acid, 50% | pass | pass | pass | fail, 8 hours |
| Phosphoric Acid, 85% | pass | pass | pass | fail, 24 hours |
| Sodium Hydroxide, 25% | pass | pass | pass | fail, 2 days |
| Hydrochloric Acid, 25% | pass | pass | pass | fail, 2 days |
| Toluene | pass | pass | pass | fail, 2 days |

*after 7 days of testing/immersion

What is claimed:

1. A method for the preparation of a phenolic/polyurea co-polymer elastomeric coating system comprising the reaction of two components where:
   (a) one component is an isocyanate quasi-prepolymer of an isocyanate and an active hydrogen containing material; and
   (b) the other component is a blend including:
      an amine-terminated polyether polyol having a molecular weight of at least about 1500;
      amine-terminated chain extenders, and
      phenolic resins;
   wherein curing of the co-polymer coating system is initiated upon mixing of the (a) component and the (b) component, said components thereby gelling in less than about 13 seconds.

2. The phenolic/ polyurea co-polymer elastomer system of claim 1 wherein the isocyanate quasi-prepolymer is prepared from an active hydrogen containing polyether polyol and/or a phenolic resin.

3. The phenolic/polyurea co-polymer elastomer system of claim 1 wherein the isocyanate quasi-prepolymer is based on an isocyanate selected from the group of isocyanates consisting of aromatic isocyanates.

4. The phenolic/polyurea co-polymer elastomer system of claim 1 wherein the isocyanate quasi-prepolymer is based on an isocyanate selected from the group of isocyanates consisting of aliphatic isocyanates.

5. The phenolic/polyurea co-polymer elastomer system of claim 1 wherein the amine-terminated resin is an amine-terminated polyoxyalkylene polyol or blend of amine-terminated polyoxyalkylene polyols.

6. The phenolic/polyurea co-polymer elastomer system of claim 1 wherein the amine-terminated chain extender is selected from the group consisting of an aliphatic, cycloaliphatic or aromatic diamine chain extenders.

7. The phenolic/polyurea co-polymer elastomer system of claim 1 wherein the amine-terminated chain extender is a blend of aliphatic, cycloaliphatic and/or aromatic diamine chain extenders.

8. The phenolic/polyurea co-polymer elastomer system of claim 1 wherein the isocyanate quasi-prepolymer further contains an epoxy resin.

9. A method for the preparation of a phenolic/polyurea co-polymer elastomeric coating system comprising the reaction of two components wherein:
   (a) the first component comprises an isocyanate; and
   (b) the second component comprises a blend of:
      active amine hydrogen containing materials, and
      phenolic resins;
   wherein at least about 70 percent of the active hydrogen groups in the reaction mixture are in the form of amine groups: and
   wherein curing of the co-polymer coating system is initiated upon mixing of the (a) component and the (b) component.

10. The method of claim 9 wherein said isocyanate comprises an isocyanate quasi-prepolymer of an isocyanate, and an active hydrogen containing material.

11. The method of claim 10 wherein said quasi-prepolymer is prepared from an active hydrogen containing material selected from the group consisting of polyols, amine-terminated alkylenes, phenolic resins, and blends thereof.

12. The method of claim 11 wherein said quasi-prepolymer is prepared from an active hydrogen containing material selected from the group consisting of polyether polyols, polyester polyols, polyesters of hydroxyl-terminated rubbers, and blends thereof, having an equivalent weight of at least about 500.

13. The method of claim 12 wherein said quasi-prepolymer is prepared from a polyether polyol based on a trihydric initiator with a molecular weight of at least about 4000.

14. The method of claim 9 wherein said phenolic resins have an active hydrogen content equal to or greater than 2.

15. The method of claim 9 wherein at least about 70 percent of the active hydrogen groups in the reaction mixture are in the form of amine groups.

16. The method of claim 10 wherein the isocyanate quasi-prepolymer is based on an isocyanate selected from the group consisting of aromatic isocyanates.

17. The method of claim 16 wherein said isocyanate quasi-prepolymer is based on the group consisting of aromatic polyisocyanates.

18. The method of claim 17 wherein the isocyanate quasi-prepolymer is based on methylene bis(4-phenylisocyanate).

19. The method of claim 10 wherein the isocyanate quasi-prepolymer is based on an isocyanate selected from the group consisting of aliphatic isocyanates.

20. The method of claim 19 wherein the isocyanate quasi-prepolymer is selected from the group consisting of aliphatic diisocyanates.

21. The method of claim 9 wherein the isocyanate index is in the range of about 0.95:1 to about 2.00:1.

22. The method of claim 9 wherein the isocyanate index is in the range of about 1.00:1 to about 1.50:1.

23. The method of claim 9 wherein the first component further comprises an epoxy resin.

24. The method of claim 9 wherein said active amine hydrogen containing materials are selected from the group consisting essentially of amine-terminated alkylenes, simple alkyl amines, amine terminated polyols, and blends thereof.

25. The method of claim 24 wherein said active amine hydrogen containing materials are selected from the group consisting of aminated diols, triols, and blends thereof, having a molecular weight greater than about 1500 and a functionality from about 2 to about 6, and an amine equivalent weight from about 750 to about 4000.

26. The method of claim 24 wherein said active amine hydrogen containing materials are a blend of primary and secondary amine-terminated polyols, having an average molecular weight of at least about 2000 and a functionality of about 2 to about 3, an amine equivalent weight from about 750 to about 4000, and greater than about 90 percent of active hydrogens in the form of amine hydrogens.

27. The method of claim 9 wherein said second component further comprises an amine-terminated chain extender selected from the group consisting of aliphatic, cycloaliphatic, and aromatic diamine chain extenders, and blends thereof.

28. The method of claim 27 wherein said amine terminated chain extenders are selected from the group consisting of 1-methyl-3,5-diethyl-2,4-diaminobenzene, 1-methyl-3,5-diethyl-2,6-diaminobenzene, and blends thereof.

29. The method of claim 28 wherein said amine terminated chain extender is 1-methyl-3,5-diethyl-2,4-diaminobenzene.

30. The method of claim 27 wherein said amine-terminated chain extenders are selected from the group consisting of amine-terminated polyethers, amine-terminated alkylenes, simple alkyl amines, and blends thereof.

31. The method of claim 30 wherein said amine-terminated chain extenders are amine-terminated polyethers having a molecular weight of less than about 400 and a functionality of from about 2 to about 6.

32. The method of claim 9 wherein said second component further comprises hydroxyl-terminated polyether chain extenders having a functionality of from about 2 to about 6.

33. The method of claim 9 wherein said reaction of two components takes place in the absence of catalyst.

34. A substrate coated with a two-component phenolic/polyurea co-polymer coating comprising the reaction product of:
(a) a first component that includes an isocyanate; and
(b) a second component that includes a blend of active amine hydrogen containing materials and phenolic resins;
wherein said (a) and said (b) components are mixed just prior to application to the substrate and allowed to cure thereon; and
wherein said active amine hydrogen containing materials are a blend of primary and secondary amine-terminated polyols, having an average molecular weight of at least about 2000 and a functionality of about 2 to about 3, an amine equivalent weight from about 750 to about 4000, and greater than about 70 percent of active hydrogens in the form of amine hydrogens.

35. The substrate of claim 34 wherein said isocyanate comprises a quasi-prepolymer is prepared from material selected from the group consisting of polyether polyols, polyester polyols, amine-terminated polyethers, and polyesters of hydroxyl-terminated rubbers, phenolic resins, and blends thereof, having an equivalent weight of at least about 500.

36. The substrate of claim 35 wherein said quasi-prepolymer is prepared from a polyether polyol based on a trihydric initiator with a molecular weight of at least about 4000.

37. The substrate of claim 34 wherein the isocyanate is based on an isocyanate selected from the group consisting of aromatic and aliphatic isocyanates.

38. The substrate of claim 34 wherein the isocyanate is based on methylene bis(4-phenylisocyanate).

39. The substrate of claim 34 wherein said active amine hydrogen containing materials include greater than about 90 percent of active hydrogens in the form of amine hydrogens.

40. The substrate of claim 34 wherein said second component further comprises a chain extender selected from the group consisting of aliphatic diamines, cycloaliphatic diamines, aromatic diamines, amine-terminated alkylenes, polyethers, simple alkyl amines, and blends thereof.

41. The substrate of claim 34 wherein said coating is applied using high temperature, high pressure, plural component spray equipment that combines said first component and said second component, wherein:
said first component and said second component are impingement mixed directed in the high-pressure spray equipment, then applied to the desired substrate via said spray equipment.

42. The substrate of claim 34 wherein pigment and reinforcing materials are added to said coating.

43. A method for the preparation of a phenolic/polyurea co-polymer elastomeric coating system comprising the reaction of two components wherein:
(a) the first component comprises an isocyanate; and
(b) the second component comprises a blend of:
active amine hydrogen containing materials, and phenolic resins;
wherein greater than about 70 percent of the active hydrogen groups in the reaction mixture are in the form of amine hydrogens.

44. A method for the preparation of a phenolic/polyurea co-polymer elastomeric coating system comprising the reaction of two components wherein:
(a) the first component comprises an isocyanate; and
(b) the second component comprises a blend of:
active amine hydrogen containing materials, and phenolic resins;
wherein said active amine hydrogen containing materials are a blend of primary and secondary amine-terminated polyols, having an average molecular weight of at least about 2000 and a functionality of about 2 to about 3, an amine equivalent weight from about 750 to about 4000, and greater than about 70 percent of active hydrogens in the form of amine hydrogens.

45. A phenolic/polyurea co-polymer composition prepared by a process comprising the steps of:

(a) preparing an isocyanate quasi-prepolymer of an isocyanate and an active hydrogen containing material; and (b) mixing said isocyanate quasi-prepolymer with a resin blend containing active amine hydrogen containing materials and phenolic resins capable of reacting with said isocyanate groups of the quasi-prepolymer composition;

wherein at least about 70 percent of the active hydrogen groups are in the form of amine groups.

46. The composition of claim 45 wherein at least about 80 percent of the active hydrogen groups in the reaction mixture are in the form of amine groups.

47. A phenolic/polyurea co-polymer composition prepared by a process comprising the steps of:

(a) preparing an isocyanate quasi-prepolymer of an isocyanate and an active hydrogen containing material; and (b) mixing said isocyanate quasi-prepolymer with a resin blend containing active amine hydrogen containing materials and phenolic resins capable of reacting with said isocyanate groups of the quasi-prepolymer composition;

wherein said active amine hydrogen containing materials are a blend of primary and secondary amine-terminated polyols, having an average molecular weight of at least about 2000 and a functionality of about 2 to about 3, an amine equivalent weight from about 750 to about 4000, and greater than about 80 percent of active hydrogens in the form of amine hydrogens.

48. A substrate coated with a phenolic/polyurea co-polymer coating comprising the reaction product of:

(a) a first component that includes an isocyanate; and (b) a second component that includes a blend of active amine hydrogen containing materials and phenolic resins;

wherein said active amine hydrogen containing materials are selected from the group consisting of primary and secondary amine-terminated polyols and blends thereof having a molecular weight greater than about 1500 and a functionality from about 2 to about 6, an amine equivalent weight from about 750 to 4000, and greater than about 70 percent of active hydrogens in the form of amine hydrogens.

49. A method for the preparation of a phenolic/polyurea co-polymer elastomeric coating system comprising the reaction of two components wherein:

(a) the first component comprises an isocyanate; and (b) the second component comprises a blend of:
primary and secondary amine-terminated polyols, and phenolic resins.

50. The method of claim 49 wherein said second component includes primary and secondary amine-terminated polyols having a molecular weight of at least about 1500, and an amine equivalent weight between about 750 and about 4000.

51. A phenolic/polyurea co-polymer elastomer material produced according to the method of claim 49.

* * * * *